US010371523B1

(12) United States Patent
Shahriar et al.

(10) Patent No.: US 10,371,523 B1
(45) Date of Patent: *Aug. 6, 2019

(54) ROTATION AND ACCELERATION SENSOR BASED ON SUPERLUMINAL RING LASERS

(71) Applicant: Digital Optics Technologies, Incorporated, Rolling Meadows, IL (US)

(72) Inventors: Selim M. Shahriar, Kildeer, IL (US); Nicholas J. Condon, Evanston, IL (US); Devin J. Hileman, Des Plaines, IL (US); Shih C. Tseng, Arlington Heights, IL (US)

(73) Assignee: Digital Optics Technologies, Inc., Rolling Meadows, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/530,464

(22) Filed: Jan. 18, 2017

Related U.S. Application Data

(63) Continuation of application No. 15/330,162, filed on Aug. 17, 2016.

(51) Int. Cl.
*G01C 19/68* (2006.01)
*H01S 3/083* (2006.01)
*H01S 3/30* (2006.01)
*H01S 3/23* (2006.01)

(52) U.S. Cl.
CPC ............ *G01C 19/68* (2013.01); *H01S 3/0835* (2013.01); *H01S 3/2366* (2013.01); *H01S 3/305* (2013.01)

(58) Field of Classification Search
CPC .... G01C 19/662; G01C 19/68; G01C 19/728; H01S 5/1071
See application file for complete search history.

(56) References Cited

U.S. PATENT DOCUMENTS 4,807,999 A * 2/1989 Soo Hoo .............. G01C 19/727
356/470
6,424,419 B1 * 7/2002 Tazartes .............. G01C 19/665
356/473

(Continued)

OTHER PUBLICATIONS

H. M. Yum, Superluminal ring laser for hypersensitive sensing, Aug. 2010, Optics Express, vol. 18, No. 17, pp. 1-8.*

(Continued)

*Primary Examiner* — Michael P LaPage
(74) *Attorney, Agent, or Firm* — Richards Patent Law P.C.

(57) ABSTRACT

Ring laser gyroscopes, in which rotation is detected by the Sagnac effect between counterpropagating lasers, are in common use in navigation applications. The invention disclosed here uses an induced strong anomalous dispersion inside the ring laser cavities to create a group velocity of as much as $10^6$ times greater than the vacuum speed of light, with a corresponding increase in gyroscope sensitivity; the resulting device is referred to as a Superluminal Ring Laser Gyroscope (SRLG). The invention disclosed here also incorporates an acceleration-sensing element that modifies the path length of the ring lasers in the gyroscope, the effects of which on the output of the gyroscope can be separated from those of rotation. The resulting composite device is a Superluminal Ring Laser Gyroscope/Accelerometer (SRLGA).

17 Claims, 8 Drawing Sheets

(56) References Cited

U.S. PATENT DOCUMENTS

2010/0014091 A1* 1/2010 Strabley .............. G01C 19/664
  356/469
2010/0232460 A1* 9/2010 Canham .............. H01S 3/0387
  372/25
2011/0255094 A1* 10/2011 Mohageg .............. G01C 19/72
  356/461

OTHER PUBLICATIONS

M. S. Shahriar, Ultrahigh enhancement in absolute and relative rotation sensing using fast and slow light, May 2007, Physical Review, pp. 1-10.*
Pati et al. Controllable Anomalous Dispersion and Group Index Nulling via Bi-Frequency Raman Gain in Rb Vapor for application to Ultraprecision Rotation sensing, Jan. 2006, 10.1109/CLEO.2006.4629099. (Year: 2006).*
Wang et al., Double-Raman Gain for Realizing a Superluminal Ring Laser, 2013, Optical Society of America (Year: 2013).*
Yum et al., Superluminal ring laser for hypersensitive sensing, Aug. 2010, Optics Express, vol. 18, No. 17 (Year: 2010).*

* cited by examiner

ROTATION AND ACCELERATION SENSOR BASED ON SUPERLUMINAL RING LASERS

CROSS-REFERENCE TO RELATED APPLICATIONS

A provisional patent application for this invention was filed on 18 Aug. 2015, Ser. No. U.S. 62/283,128, and this application claims benefit of its filing date.

STATEMENT REGARDING FEDERALLY SPONSORED RESEARCH OR DEVELOPMENT

This invention was made with government support under HQ0147-15-C-7123 awarded by the Missile Defense Agency, FA8651-13-C-0011 awarded by the Air Force, FA8651-13-C-00118 awarded by the Air Force, FA9453-14-C-0191, awarded by the Air Force, and NNX15CM35P awarded by the National Aeronautics and Space Administration. The government has certain rights in the invention.

BACKGROUND OF INVENTION

1. Field of the Invention

The present invention relates generally to devices for measuring their own absolute rotation and acceleration and specifically to such devices constructed using optical means.

2. Description of the Background Art

Careful determinations of orientation and acceleration are critical to applications such as the navigation of air and space vehicles and the direction and stabilization of sensors and communications equipment on such platforms. With knowledge of starting orientation and position and a complete history of all rotations and accelerations, the orientation and position of the object can be determined at any time. In the absence of external referents (which may be transient or prolonged), it is necessary to measure orientation and position continuously on all six axes (three acceleration, three rotation). There are a number of technologies to provide rotation and acceleration sensing currently in use.

Mechanical gyroscopes, which use the rotational inertia of a spinning rotor, are one option for sensing rotation, but their complexity and weight limit their application in practice. In 1963 [1], the first ring laser gyroscope (RLG) was demonstrated. These gyroscopes make use of the Sagnac effect to sense rotation. Briefly, a ring laser in operation can be considered as two lasers operating simultaneously in the same beam path: One clockwise, the other counterclockwise. If the RLG undergoes a rotation in the plane of its ring, the two lasers will experience Doppler shifts in opposite directions. Monitoring the beat frequency between the two lasing directions thus provides a measure of the rotation rate of the RLG whose sensitivity is proportional to the area described by the ring. Three RLGs, oriented perpendicular to each other, are capable of measuring the absolute rotation in all directions of the platform to which they are attached. One issue with conventional RLGs is the phenomenon of lock-in[2], in which scattering causes the frequencies of the two lasers to become locked together. This causes the beatnote between the two lasers not to change in response to small rotation rates, placing a limit on their utility in slowly rotating systems; various modulation techniques have been used to mitigate this problem.[3] Operating the lasers at nondegenerate frequencies, preferably with a constant, controlled offset frequency between them, would prevent lock-in entirely.

It has been shown that the incorporation of an element with a strong anomalous dispersion in a traveling-wave ring laser cavity can cause the group velocity of the light in the cavity to go up by a factor of as much as $10^6$ under experimentally reasonable conditions.[4, 5] Since the group velocity is greater than the speed of light in a vacuum, a laser in such a state is thus said to be operating superluminally. If two such superluminal ring laser cavities, operating in opposite directions, are positioned immediately adjacent to each other and their outputs are interfered, they will form a Superluminal Ring Laser Gyroscope (SLRG). The sensitivity of an SLRG is much greater than that of a conventional RLG of the same dimensions.

Accelerometers have been developed based on a number of sensing methods centering on a mass that exerts a force on a sensor or moves relative to the rest of the system. Current state-of-the-art systems often use piezoelectric quartz crystals[6] for sensing. If a mirror is affixed to a mount such that it can move in response to acceleration in the direction normal to its reflective surface, then, in the limit of small movements, its displacement will be proportional to the acceleration in that direction. Incorporation of this mirror into an interferometer to measure the resultant length change creates an optical accelerometer. An optical accelerometer could also be created by incorporating this acceleration-sensitive mirror into an active laser cavity; motions of the mirror would correspond to shifts in the lasing wavelength of the cavity. If such an acceleration-sensitive mirror is incorporated into the cavity of a superluminal ring laser to produce a Superluminal Ring Laser Accelerometer (SRLA), it would derive a similar enhancement in sensitivity to that achieved by the SRLG. A composite device, consisting of two counterpropagating superluminal ring lasers in a cavity incorporating an acceleration-sensitive mirror, would be capable of sensing both rotation and acceleration with high sensitivity, and thus would be a Superluminal Ring Laser Gyroscope/Accelerometer (SRLGA).

The Physics of Superluminal Lasers

The basic concept of how a device such as a ring laser gyroscope becomes extremely sensitive under superluminal operation (using anomalous dispersion) can be explained in simple terms, as shown in FIG. 1. Consider a generic ring laser, operating in one direction, as shown in FIG. 1A. When lasing, the wavelength $\lambda$ is simply related to the cavity length L by an integer, m. At the same time, $\lambda$ is simply related to the product (nf) of the index n and the frequency f. The sensitivity S of the laser is defined as $\partial f/\partial L$: this number tells us how much the frequency changes when the cavity length changes (e.g., due to rotation). This is illustrated in FIG. 1B. From these relations, it follows that the sensitivity, S, is inversely proportional to $\partial \lambda/\partial f$, as indicated in FIG. 1C.

For a conventional ring laser, n is nearly a constant, so that $\lambda$ varies inversely as f, corresponding to a hyperbolic curve shown in FIG. 1D. The sensitivity is inversely proportional to the slope of this curve at the operating point. In an "ideal" superluminal laser, the presence of a dip in the gain produces a negative dispersion, so that over a small range, n decreases with f, as shown in FIG. 1E. If this slope is tuned properly, we can create a condition so that (nf) is a constant. Under this condition, $\lambda$ is completely independent of f, as shown by the flat line (FIG. 1E). Since the slope of this line is zero, the sensitivity approaches infinity. Under this condition, the group velocity $V_g$ of light also approaches infinity; hence the term "superluminal." It may be helpful to note that the group index mentioned earlier can be expressed as $n_g=C_o/V_g=\partial(nf)/\partial f$, which vanishes when (nf) is a constant, corresponding to group velocity approaching infinity. In practice, (nf) is not exactly constant over a finite range, so that the sensitivity remains large but finite, as illustrated in FIG. 1F. The specific factor of enhancement is given ideally by $1/n_g$. When non-linearities in dispersion are taken into account, the enhancement factor, denoted as $\xi$, remains finite even when $n_g$ vanishes at the exact center of the dispersion profile. As we have shown, [4, 5] the value of $\xi$ can be as high as $10^6$ for experimentally realizable parameters.

What is described above shows how the change in the frequency of a ring laser as a function of a change in the length of the cavity is enhanced due to the anomalous dispersion. To see how this enhancement also implies a corresponding enhancement in the sensitivity of a ring laser gyroscope (RLG), we recall first the operating principle of an RLG. Consider, for example, light propagating in opposite directions in a closed loop. The Sagnac effect, which follows from application of the relativistic laws of addition of velocities, shows that there is a delay between the propagation times for the two beams which is proportional to the area of the loop and the rate of rotation normal to the loop. As we have shown,[4] the effect can be shown to be equivalent to an effective change in the cavity length, of equal and opposite amplitudes in the two counter-propagating directions. Thus, if the frequency-to-length sensitivity parameter $(\partial f/\partial L)$ is enhanced by a factor of $1/n_g$, then the Sagnac effect is also enhanced by the same factor $(1/n_g)$.

For a resonator or a laser, the Sagnac effect corresponds to a change in the resonance frequency in each direction. Specifically, for a conventional RLG, the beat frequency between the two counter-propagating lasers is given by $\Delta f_{RLG}=(4\ f\Omega A)/(C_o nP)$, where f is the mean laser frequency, A is the area, P is the perimeter, $C_o$ is the vacuum speed of light, n is the mean index of the gain medium, and $\Omega$ is the component of the rotation normal to the RLG. For an SRLG, the beat frequency is enhanced by the parameter $\xi$, so that $\Delta f_{RLG}=\xi(4\ f\Omega A)/(C_o nP)$. This result has been proven rigorously.[4, 5]

The minimum measurable rotation for such a system is determined by the minimum measurable beat frequency. Of course, this quantity can be affected by the presence of excess noise beyond the quantum noise limit. If this excess (classical) noise can be sufficiently suppressed, the fundamental limit is due to the quantum noise only. It is well known that for such a system, the limit is given by: $\delta\omega_{min}=2\pi\cdot\delta f_{min}=(1/\tau_C)\sqrt{(hf)/(P_{out}\tau)}$, where $\tau_C$ is the lifetime of a photon inside the cavity, given by the inverse of the passive-cavity linewidth, $P_{out}$ is the output power incident on the detector, $\tau$ is the averaging time, h is the Planck's constant, and f is the mean frequency. This result can be illustrated by noting that for each laser, the Schawlow-Townes linewidth is given by $\gamma_{STL}=(hf)/(2\ P_{out}\tau_C^2)$ and the measurement bandwidth (FWHM) is given by $\gamma_M=1/\tau$. The effective linewidth of each laser is the geometric mean of these linewidths: $\gamma_{eff}=\sqrt{\gamma_{STL}\gamma_M}=(1/\tau_C)\sqrt{(hf)/(2P_{out}\tau)}$. The minimum measurable beat frequency is simply the rms (root-mean-square) value of the effective linewidths for the two lasers: $\delta\omega_{min}=\sqrt{2}\gamma_{eff}$. Since the passive cavity linewidth remains unchanged for an SRLG, the expression for the Schawlow-Townes linewidth, and therefore for the minimum measurable beat frequency, remains unchanged for an SRLG, as discussed in detail in references 4 and 5. The photon lifetime for a ring resonator is given by $\tau_C=FPn/C_0$, where L=P is the length of the resonator, and F is the finesse of the passive cavity, given, for a ring resonator, by $F=2\pi\sqrt{R}/(1-R)$, with R being the intensity reflectivity of the output coupler, assuming the rest of the mirrors are perfectly reflecting. The minimum measurable rotation-rate (MMR) is given by equating the beat frequency derived above to this minimum-measurable frequency, which yields:

$$\Omega_{min} = \frac{1}{8\pi}\frac{\lambda_0 C_0}{\xi A}\frac{1}{F}\sqrt{\frac{hf}{P_{out}\tau}} = \frac{C_0 n}{4\xi Q}\frac{P}{A}\sqrt{\frac{hf}{P_{out}\tau}} \approx \frac{T}{16\pi^2}\frac{\lambda_0 C_0}{\xi A}\sqrt{\frac{hf}{P_{out}\tau}} \quad (1)$$

where $\lambda_0=C_0/f$. The second expression in eqn. 1 (which is the same as equation 2 in reference 7, for $\xi=1$ and n=1) follows from the fact that the quality factor of the bare cavity can be expressed as $Q=2\pi FPn/\lambda_0$. The third expression in eqn. 1 follows from the fact that for a typical gyroscope, a mirror with a very high reflectivity is used, so that $F\approx 2\pi/(1-R)=2\pi/T$, where T is the intensity transmissivity of the output mirror. Eqn. 1 is the main expression characterizing the SRLG. It shows clearly that the sensitivity scales inversely with the area. We note the following features of this expression:

Parameter Optimization:

For $\xi=1$, this expression yields the MMR for a conventional, quantum-noise limited RLG. In this case, the MMR is proportional to the inverse of the area, and the inverse of the finesse F of the empty cavity. Thus, a design of such a gyroscope must make use of maximum possible values of these parameter. Furthermore, since it is also proportional to the inverse of the square-root of the laser power, maximizing the power of the laser is also warranted. Finally, the inverse dependence on the square-root of the averaging time is as expected from any system limited by quantum noise.

Effect of Superluminal Enhancement:

The presence of the superluminal enhancement, which can be as high as $10^6$ for realistic experimental parameters, can reduce the MMR by the same factor, if all other factors are the same. Alternatively, a much smaller SRLG can measure the same rotation rate as that measurable by a larger RLG.

Dynamic Range:

The enhancement factor, $\xi$, is large for a small change in frequency, but drops off with increasing frequency shifts. This non-linearity can be encoded into the hardware or software for the SRLG in translating the observed beat frequency to rotation rate. Furthermore, this non-linearity allows the user to cover a large dynamic range, while maintaining ultra-high sensitivity for very small rotations.

3. Related Prior Art

Several patents have been filed by others that seek to exploit the superluminal effect in gyroscopes. The invention presented here is distinct from all of these in three ways: First, the two counterpropagating lasers in this invention are operated at different frequencies, thus eliminating the lock-in effect; this method is used in none of the other patents. Second, the method in this invention for producing the anomalous dispersion required for superluminal operation is an active Raman process in an alkali vapor, rather than being an innate feature of the gas mixture. Third, this invention incorporates an acceleration-sensitive element directly into the superluminal cavity, providing simultaneous rotation and acceleration sensing; none of the other patents incorporate acceleration sensing. Strabley 2011[7] uses anomalous dispersion produced by varying isotope mixtures in a helium-neon laser-based gyroscope. The invention presented here uses an entirely different method for inducing the superluminal effect, and is thus distinct. Salit 2013a[8] again uses the helium-neon gain medium and a method of inducing the superluminal effect, and is thus distinct from this invention. Salit 2013b[9] uses innate anomalous dispersion in the lasing medium, and is thus distinct from this invention.

SUMMARY OF THE INVENTION

Accordingly, it is an object of this invention to measure, by means of the Sagnac effect in ring lasers, the rotational rate of an object.

It is another object of this invention to increase the sensitivity of rotation sensing beyond that which is provided by conventional Sagnac effect RLGs.

It is another object of this invention to reduce the size, weight, and power of an RLG required to measure rotational rate to a given accuracy.

It is another object of this invention to eliminate the problem of lock-in in optical gyroscopes.

It is another object of this invention to measure, by means of an active laser cavity containing an acceleration-sensitive mirror assembly, the acceleration on an object.

It is another object of this invention to increase the sensitivity of acceleration sensing beyond that which could be provided by a conventional optical cavity accelerometer.

It is another object of this invention to combine both rotation and acceleration sensing in a single cavity.

These and other objects of this invention are accomplished by a system consisting of two ring lasers, sharing a common cavity and lasing in opposite directions, which incorporate a mechanism to increase the group velocity of the lasers to beyond the vacuum speed of light, to comprise a superluminal ring laser gyroscope (SRLG), with the inclusion of an acceleration-sensitive mirror to simultaneously produce a superluminal ring laser accelerometer (SLRA). The combined superluminal ring laser gyroscope/accelerometer (SRLGA) would be capable of sensing rotation around one axis and acceleration in a perpendicular axis. Three such SRLGA's may be positioned with mutually perpendicular ring planes to allow measurement of the complete inertial motion of a platform.

BRIEF DESCRIPTION OF THE DRAWINGS

A more complete appreciation of the invention will be readily obtained by reference to the following Description of the Preferred Embodiments.

DESCRIPTION OF THE PREFERRED EMBODIMENTS

Figure 1:
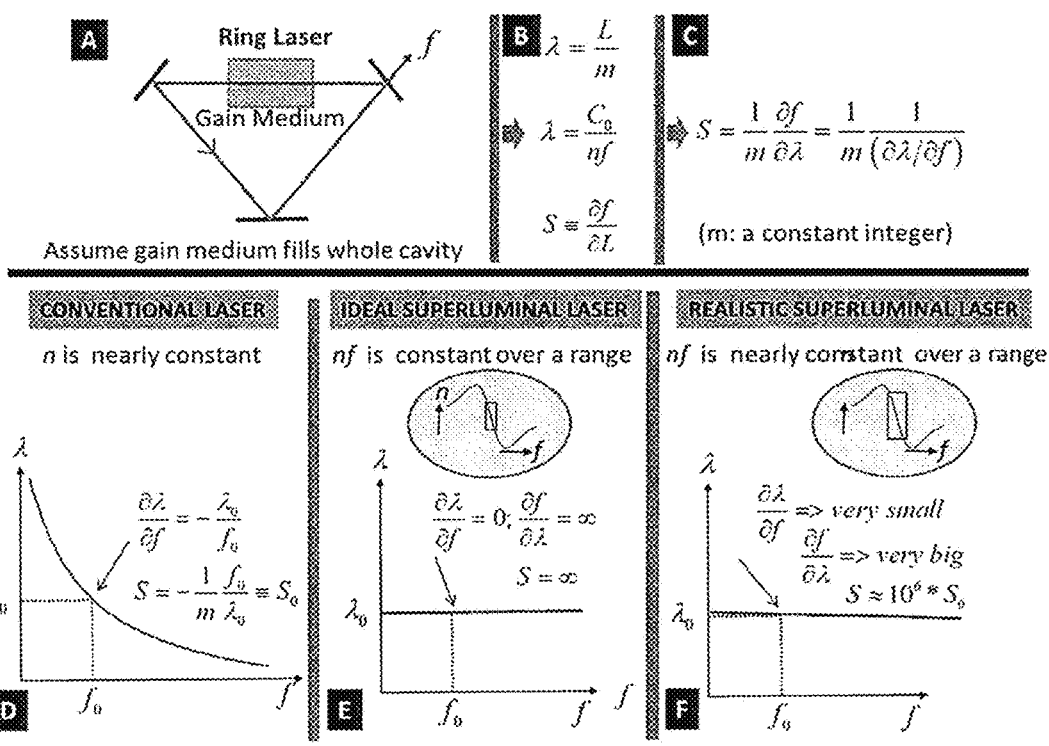
FIG. 1 illustrates the concepts behind superluminal laser enhancement.
Figure 2:
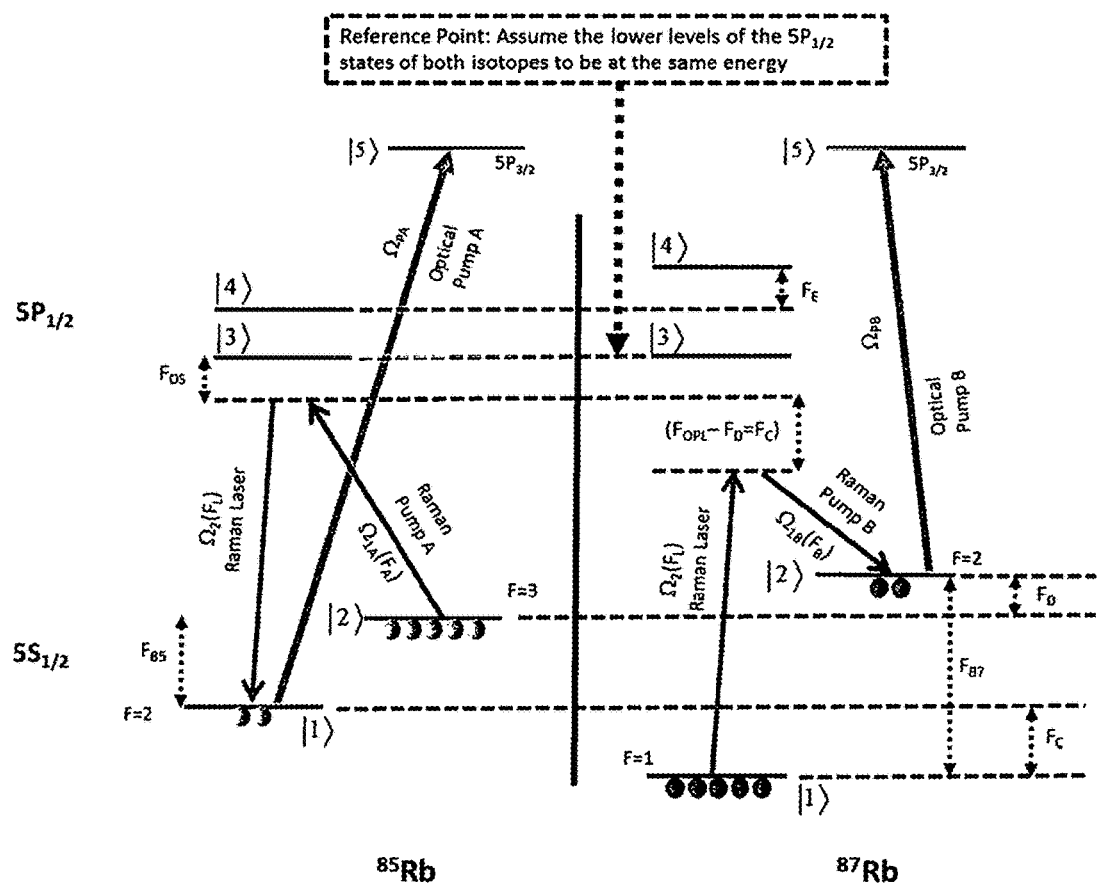
FIG. 2 shows the transitions in rubidium that are used to generate lasing and superluminal group velocity in the invention.
Figure 3:
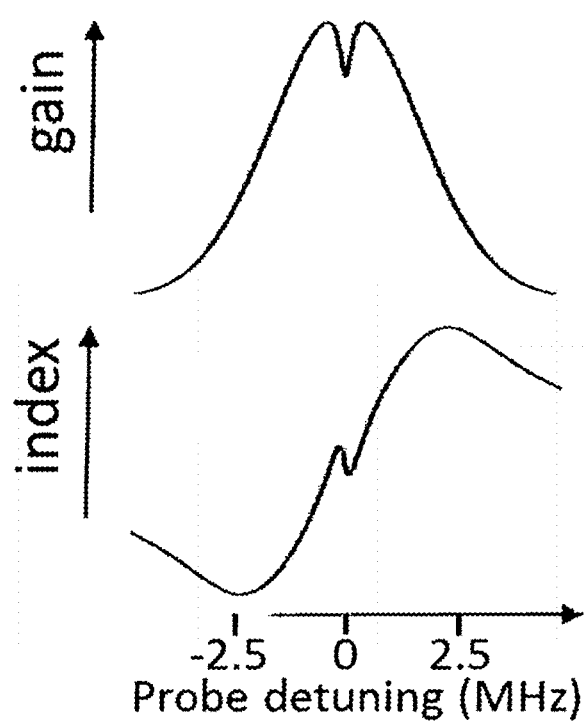
FIG. 3 shows the combined laser gain and index of refraction profiles of the sort used to generate superluminal lasing in the invention.

The new system for generating the requisite gain profile for an SRL is illustrated in FIG. 2, using a single cell containing two naturally occurring isotopes of Rb ($^{85}$Rb and $^{87}$Rb). Note first that the energy difference between the two ground states $|1\rangle$ and $|2\rangle$ is different for the two isotopes (3.035732439 GHz=$F_{85}$ for $^{85}$Rb and 6.834682611 GHz=$F_{87}$ for $^{87}$Rb). Furthermore, the absolute transition frequency for the 1-4 transition in $^{85}$Rb is lower by about 1.5 GHz than that for $^{87}$Rb. Similarly, the absolute transition frequency for the 1-3 transition in $^{85}$Rb is lower by about 1.5 GHz than that for $^{87}$Rb. These non-degeneracies make it possible to use two distinct optical pumps (shown by the purple lines) for the two isotopes. Use of a neon buffer gas can reduce the population relaxation rate between the ground states to as low as 10 kHz. We apply two different Raman pumps ($\Omega_{1A}$ at frequency $F_A$ and $\Omega_{1B}$ at frequency $F_B$) for the two isotopes and a common Raman probe $\Omega_2$. When the optical pump $\Omega_{PA}$ resonant with the transition from level $|1\rangle$ to $|4\rangle$ in $^{85}$Rb is applied, the depletion of atoms in level $|1\rangle$ induces population inversion between $|1\rangle$ and $|2\rangle$, thereby producing a Raman gain for the signal. We also apply the other optical pump $\Omega_{PB}$ resonant with the transition from $|2\rangle$ to $|4\rangle$ in $^{87}$Rb, which produces depletion of atoms in level $|2\rangle$, thereby generating Raman absorption for the same signal. The width of the Raman gain in $^{85}$Rb and Raman absorption in $^{87}$Rb can be independently controlled, with a lower limit of ~10 kHz for each, set by the decay rate between levels 1 and 2 (when the residual Doppler width is taken into account, this is increased by about 5 kHz for $^{85}$Rb and 11 kHz for $^{87}$Rb, as discussed later in this subsection). With suitable choices of parameters, it is possible to achieve a narrow dip on top of a broad gain in the transmission profile. We show a typical susceptibility as a function of the signal detuning for such a case in FIG. 3. The rather narrow (max about 5 MHz) width of the envelope gain profile would guarantee single mode oscillation.

It is necessary to ensure that the two Raman pumps are offset-phase-locked with respect to each other. The frequency difference, $F_{OPL}$, between these two pumps should be such that $F_{OPL}=F_A-F_B=F_{87}-F_{85}=3.798950172$ GHz. Of course, the degree of precision in this number would be determined by the stability of the VCO used in the offset-phase-locking system.

Furthermore, a stable AOM (or a sideband from an EOM), would be used to ensure that these pumps are offset stabilized to an absolute frequency. Specifically, the Raman pump for $^{85}$Rb would be locked at a frequency that is below the 2-3 transition by a frequency offset of $F_{OS}$. The value of $F_{OS}$ should be chosen to ensure that both Raman pumps are away (e.g., by more than the Doppler half-width of ~300 MHz) from absorption in both $^{85}$Rb and $^{87}$Rb.

Given this system, we now describe how to realize overlapping, counter-propagating, non-degenerate lasers for producing a robust SRLG. It is well know that a Raman laser is unidirectional; it only lases in the direction of the pump (this aspect is discussed in greater detail later on in this subsection). Thus, we can use two different cells, each of which will have the components described above. However, the direction of the Raman pumps will be reversed. The pumps will be dumped with polarizing beam splitters (PBSs) so that pumps for one cell cannot enter the other. Furthermore, in one, the Raman pump for $^{85}$Rb will be tuned above resonance, while in the other it will be tuned below resonance. The difference between these two will be tuned to be one free spectral range (FSR) of the cavity. This will ensure that the laser in one direction will not affect the dynamics of the other laser. The non-degeneracy between the counter-propagating lasers will provide a natural offset frequency. Such an offset enables one to determine the sign of rotation, and eliminates the lock-in problem. For concreteness, let us assume that the Raman laser in the clock-wise direction has a longitudinal (integer) mode number m (i.e., m=L/λ, where L is the cavity length and λ is the wavelength of the Raman laser), and the Raman laser in the counter-clock-wise direction has a longitudinal mode number of (m−1). The value of m can be determined easily, given the known value of the 1-3 transition frequency in $^{85}$Rb, the value of $F_{OS}$, and the FSR of the cavity.

To detect the SRLG signal, the outputs of the two Raman lasers are mixed on a photodetector. The output of the detector is then mixed with a VCO at a frequency that is the sum of the values of $F_{OS}$ for the two directions, which is equal to the FSR of the cavity, and sent through a low-pass filter to eliminate the sum frequency. A voltage proportional to the output frequency would be generated by using the well-known PLL-FM demodulation technique (PLL: Phase-locked-loop; FM: Frequency Modulation). The sign of the rotation can be determined, for example, by changing the frequency of the VCO in one direction and monitoring the corresponding increase (for one sign) or decrease (for the other sign) in the final output signal.

For long observation periods, or for applications demanding extreme precision, fluctuations in the cavity length cannot be ignored. A change in the cavity length will produce a shift in the resonance frequency for each mode, and the corresponding change in the FSR. In order to account for and rectify errors resulting from such a change, we will employ the following common-mode rejection servo mechanism, made possible by the fact that the SRLG excitation beams include lasers locked to absolute frequency references. First, for each direction, we will detect the beat signal between the $^{87}$Rb Raman pump and a small part of the Raman laser output (while the rest of the outputs of the Raman lasers will continue to be used for detecting and processing the beat signal between them, as described in the preceding paragraph). This signal will then be mixed with a stable VCO at $f_{87}$ (=6.834682611 GHz), followed by a low pass filter, so that we get only the difference frequency. This beat frequency is converted to a voltage using a PLL-FM demodulator. We denote as $\delta f_m$ ($\delta f_{m-1}$) the resulting voltage signal for the clock-wise (counter-clock-wise) laser. Furthermore, we define the signals $\Sigma \equiv \delta f_m + \delta f_{m-1}$ and $\Delta \equiv \delta f_m - \delta f_{m-1}$, which can be easily generated. Consider now a situation where the sum of the two Raman laser frequencies have changed by an amount that corresponds to a voltage signal $\delta_{CM}$ due to a change in the cavity length (a common-mode effect), and the difference between the two Raman laser frequencies have changed by an amount that corresponds to a voltage signal $\delta_{SE}$ due to the Sagnac effect (i.e., rotation). A straight-forward analysis shows that $\delta_{SE} = Z[\Delta - (2m-1)\Sigma]$ and $\delta_{CM} = Z[\Sigma - (2m-1)\Delta]$, where $Z = (2m-1)/[(2m-1)^2 - 1]$. For m>>1, this simplifies to $\delta_{SE} \approx (-\Sigma + \Delta/2m)$, and $\delta_{CM} \approx (-\Delta + \Sigma/2m)$, each of which can be generated as a voltage signal, given the determined value of m. The value of $\delta_{CM}$ will be used as a feedback signal to correct for the fluctuations in the cavity length, producing the condition that $\delta_{CM} = 0$. Under this condition, we then also get $\delta_{SE} \approx -\Sigma(1-4/m^2) \approx -\Sigma$. However, in order to ensure that the quantum noise in the final SRLG signal is from the Raman lasers only, we will use the output of the detection system described in the preceding paragraph, since it involves mixing of the Raman lasers only.

Figure 4A:
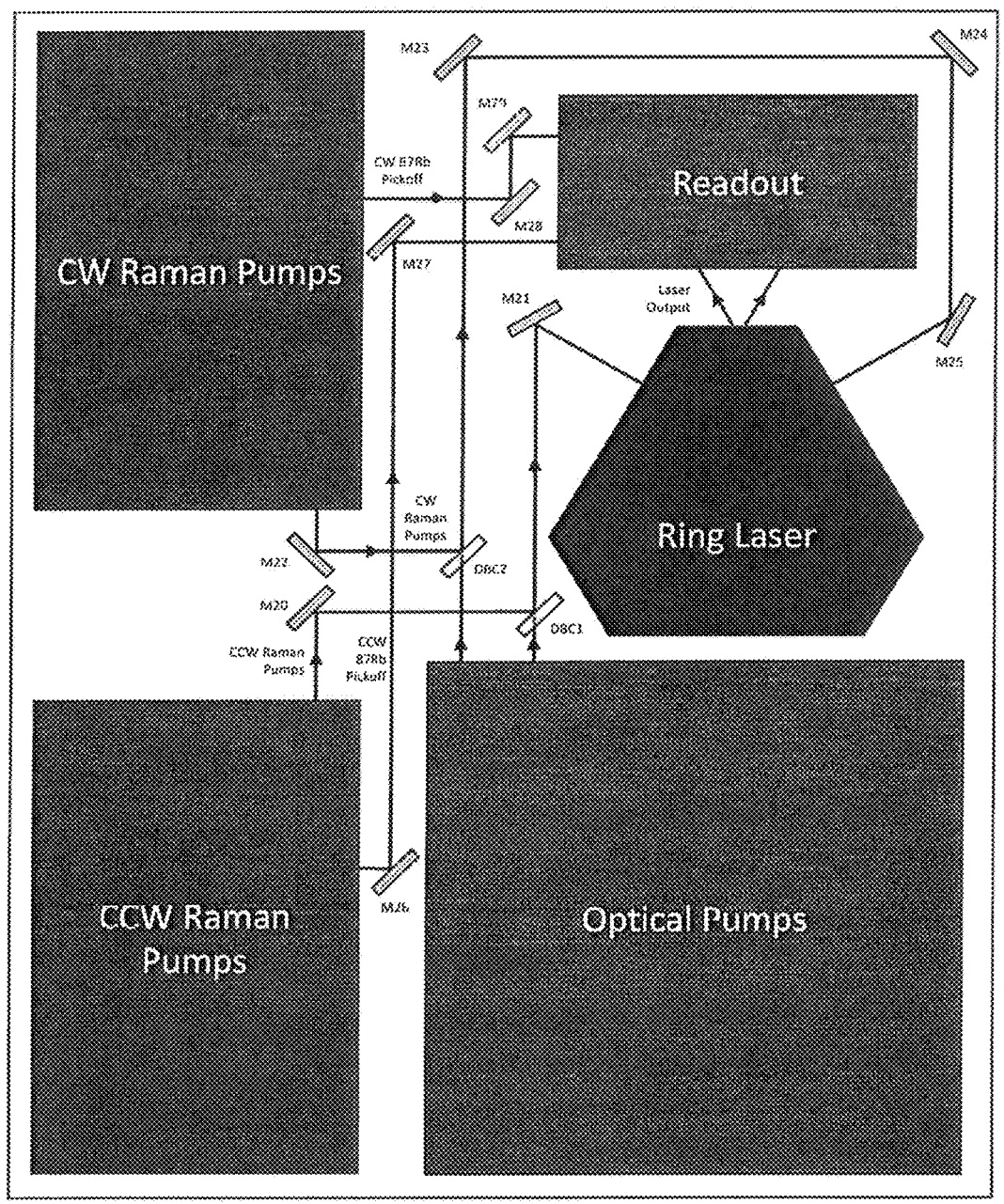
FIG. 4A shows the layout of the various modules and the optics and laser beam lines connecting the modules.

FIG. 4A shows the overview of the entire system and the lasers and optics that couple them together. There are five modules in the system: The clockwise (CW) Raman laser pump module, the counterclockwise (CCW) Raman laser pump module, the optical pump module, the ring laser module, and the readout module. Each Raman laser pump module produces an output that is the combined pair of 795 nm lasers necessary to pump the $^{85}$Rb Raman gain process responsible for lasing and the $^{87}$Rb Raman loss process responsible for providing the dispersion necessary for superluminal lasing. They also provide a pickoff from the laser pumping the $^{87}$Rb Raman loss process for locking and stabilization. The optical pump module provides two identical outputs, each of which is the combined output of the 780 nm lasers necessary for the optical pumping of both $^{85}$Rb and $^{87}$Rb. Each Raman pump output is combined with one of the two optical pump outputs on a dichroic beam combiner and the resulting combined set of beams is directed into one input to the ring laser module. The outputs from the ring laser module, along with the pickoffs of the $^{87}$Rb Raman pump lasers, are directed into the readout module. The readout module then produces the desired rotation and acceleration signals, as well as providing a lock signal to the PZT in the ring laser module. Each module of this system will be described in detail individually.

Figure 4B:
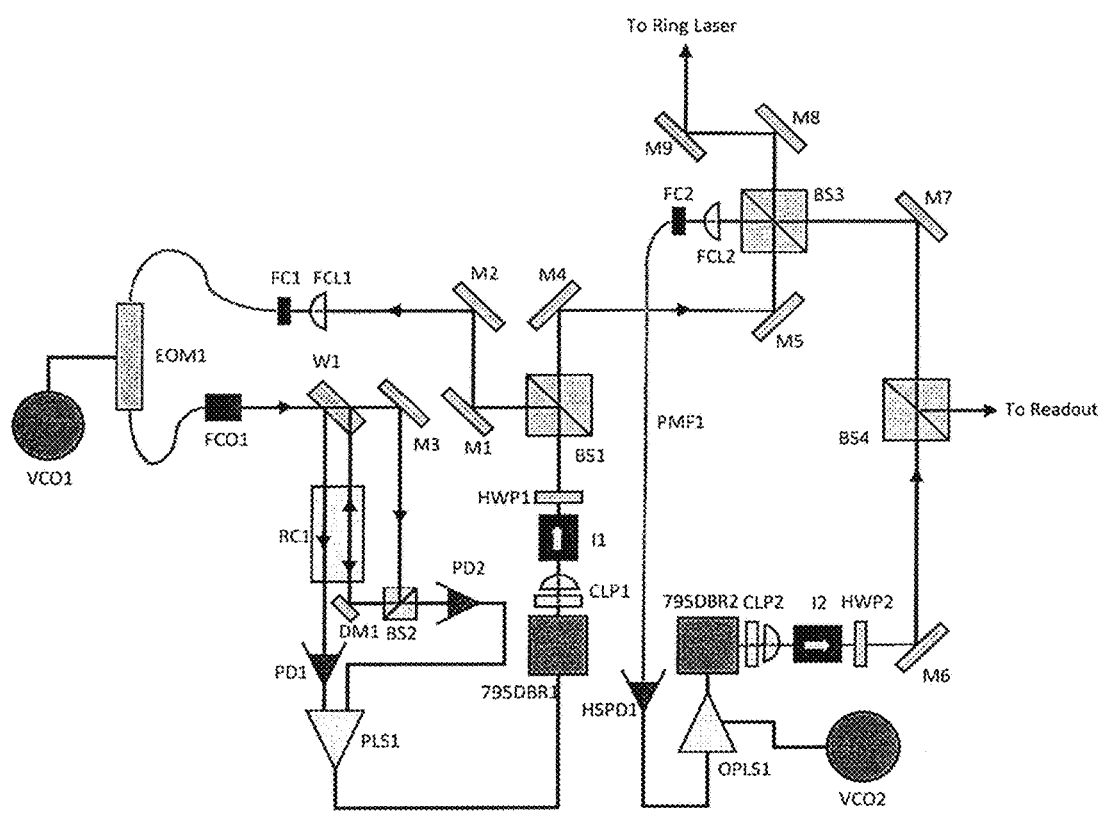
FIG. 4B shows a schematic of a Raman pump module.

The two Raman pump modules are functionally identical, differing only in the frequency offsets provided to the lasers. The schematic of one Raman pump module is shown in FIG. 4B. It contains two 795 nm DBR lasers. The output of one of these lasers (795DBR1) will be the pump for the Raman lasing process. It is collimated, passed through an isolator and a half-wave plate, and split (BS1) into two equal-powered beams. One of these beams is focused into the fiber input of an electro-optic intensity modulator (EOM1). A voltage-controlled oscillator connected (VCO1) is connected, through appropriate amplifiers, to the EOM, which splits the laser into a carrier and a series of odd-ordered sidebands. One of the first-order sidebands will be selected for locking to an $^{85}$Rb resonance. The output of the modulator is then sent back into free space and into a saturated absorption system. An uncoated, thick flat window (W1) reflects two low-power pickoffs of the beam through a heated rubidium vapor cell (RC1). The remainder of the beam is reflected into a 50/50 beamsplitter (BS2), which directs part of it back along the same path as one of the two low-power pickoffs. One photodetector (PD1) measures the unsaturated absorption signal, while a second (PD2) measures the saturated absorption signal. A locking servo (PLS1) dithers the laser frequency across a small portion of the $^{85}$Rb absorption spectrum and uses the difference between the saturated and unsaturated outputs to lock the EOM-shifted laser frequency to one of the hyperfine resonances of $^{85}$Rb. This means that the frequency of the DBR output itself is thus locked at a constant offset frequency (determined by the VCO and the choice of sidebands) from the $^{85}$Rb resonance. A second laser (795DBR2) provides the Raman pump for the $^{87}$Rb Raman loss process. It is collimated and passed through an isolator and a half-wave plate, then a pickoff from it is extracted (BS4) and sent to the readout module. The remainder of the beam is combined on a 50/50 beamsplitter (BS3) with the output from the first DBR. One output from this beamsplitter is directed into a fiber-coupled high speed photodetector (HSPD1), which provides the beatnote between the lasers to an offset phase locking servo. This servo controls the frequency of the second DBR so that the beatnote between the two DBRs is held constant at the frequency determined by a second voltage-controlled oscillator (VCO2). The other output from the beamsplitter is directed (after combination with one of the outputs of the optical pump module) into the ring laser module.

Figure 4C:
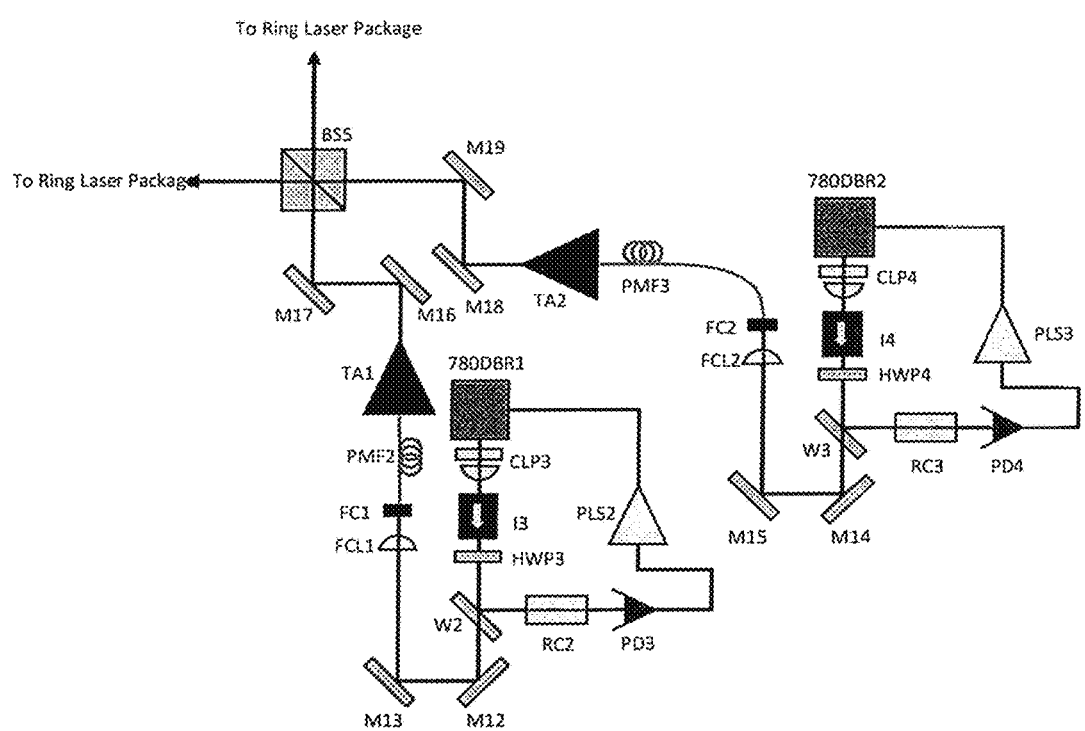
FIG. 4C shows the schematic of the optical pump module.

The optical pumps for the clockwise and the counter-clockwise laser are provided by the two outputs of the optical pump module, shown in FIG. 4C. There are two 780 nm DBR lasers in the optical pump module. Both follow identical paths, but one is locked to a $^{85}$Rb absorption transition and the other is locked to a $^{87}$Rb absorption transition. Each laser is collimated and passed through an isolator and half-wave plate, then a pickoff from it is passed through a heated rubidium vapor cell (RC2/RC3) and into a photodetector. A servo (PLS2/PLS3) uses the signal from the photodetector to lock the frequency of the DBR to the appropriate transition. Each beam is then directed into a fiber-coupled tapered amplifier (TA1/TA2) to increase its power to appropriate levels. The outputs of the two tapered amplifiers are combined on a 50/50 beamsplitter (BS5), and the two outputs of the beamsplitter are directed individually (after combination with one of the Raman pump module outputs) into the ring laser module.

Figure 4D:
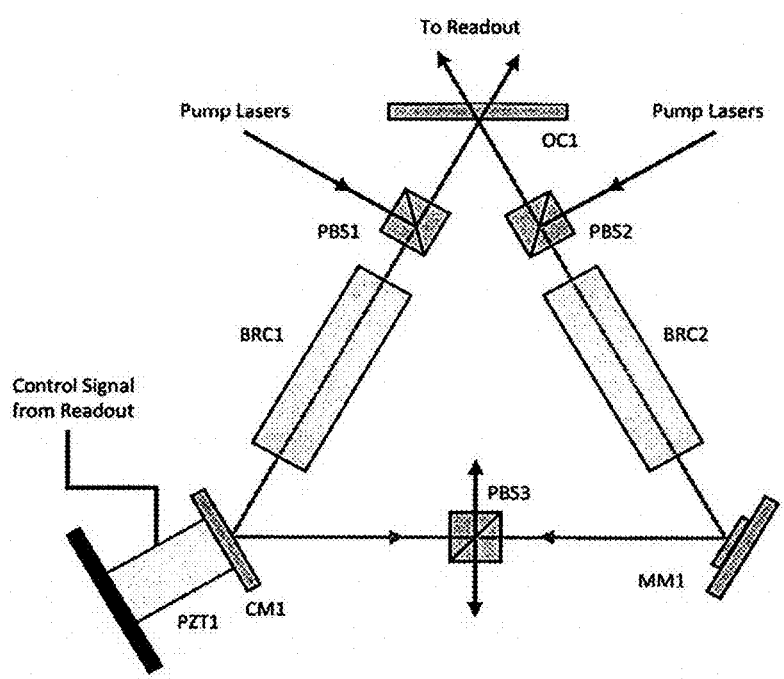
FIG. 4D shows the schematic of the ring laser module.

The heart of the SLRG/A is the ring laser module, a schematic of which is shown in FIG. 4D. It produces a pair of counterpropagating superluminal Raman lasers that share a common path. Each combined set of Raman and optical pump lasers is directed in the vertical polarization into a polarizing beamsplitter (PBS1/PBS2) and is dumped out of the cavity before completing a round trip by a common polarizing beamsplitter (PBS3). The superluminal lasers propagate in the horizontal polarization and pass through the polarizing beamsplitters unaffected. Gain is provided by two rubidium vapor cells (BRC1 and BRC2) that contain a helium buffer gas to allow for narrower transitions. The triangular cavity is defined by three mirrors. One mirror (CM1) is a high reflector attached to a PZT cylinder to allow for active control of the cavity length by a servo in the readout module. The second mirror (MM1) is a gold mirror on MEMS-fabricated springs; the motion of this mirror allows for acceleration detection. The third mirror (OC1) is a concave output coupler whose curvature and reflectivity are chosen to provide optimal laser performance. The superluminal laser outputs are directed into the readout module for measurement. The entire module is contained within a monolithic machined aluminum body that is contained within a mu metal shield to protect against interference from external magnetic fields. This body is heated with resistance wire to the temperature necessary to provide the rubidium vapor pressure needed for optimal laser performance.

Figure 4E:
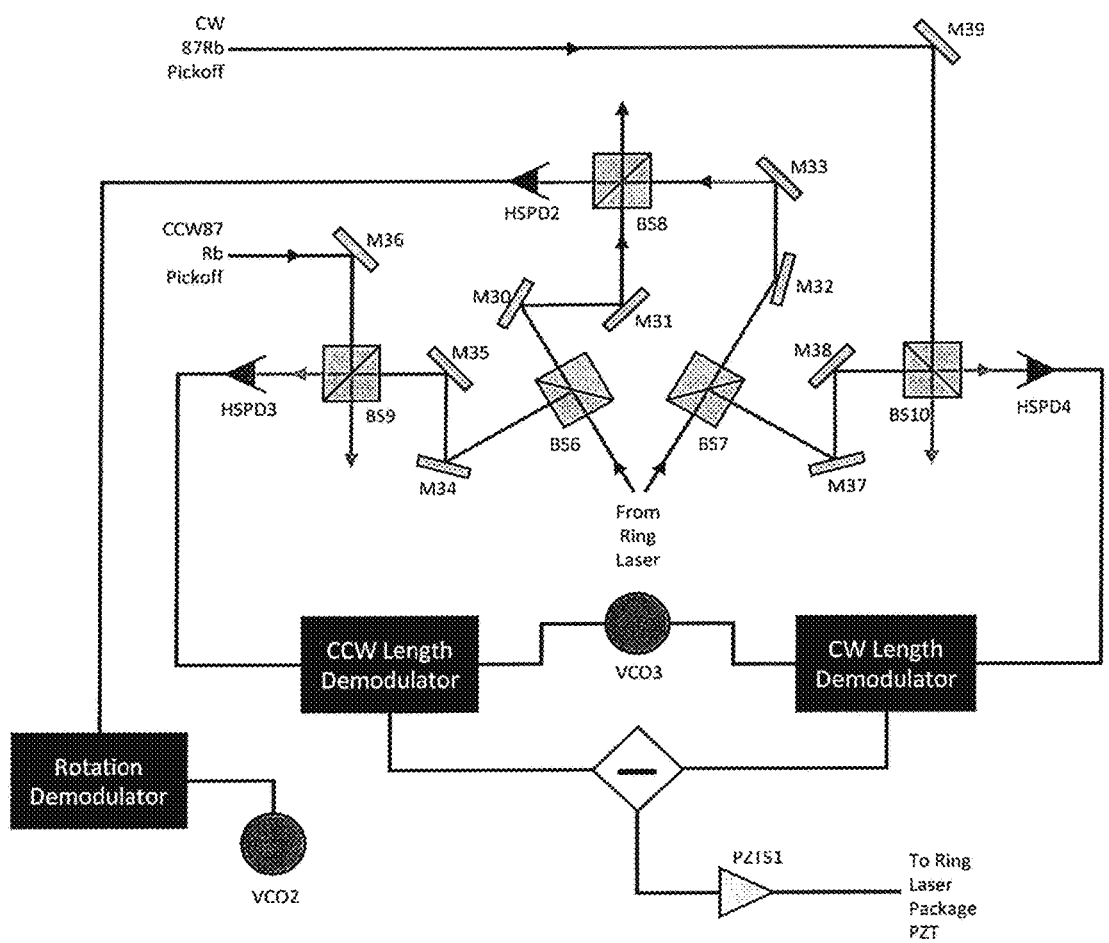
FIG. 4E shows the schematic of the readout module.

The readout module measures the frequency differences induced in the two superluminal lasers in order to extract the rotation rate and linear acceleration experienced by the ring laser module; a schematic of this module is shown in FIG. 4E. There are four inputs to this module: The two superluminal laser outputs and the pickoffs from the two $^{87}$Rb Raman pump lasers. A pickoff from each optical pump (BS6/BS7) is combined on a 50/50 beamsplitter (BS9/BS10) with its corresponding $^{87}$Rb Raman pump and the resulting beatnote is detected with a high-speed photodetector (HSPD3/HSPD4). The output of each detector is mixed with the output of a voltage-controlled oscillator (VCO3) set at the 6.834682611 GHz frequency corresponding to the spacing between the two $^{87}$Rb ground-state hyperfine levels. This signal is then demodulated using a phase-locked loop to provide a DC signal proportional to the departure of each superluminal laser frequency from the value expected of from an unmoving system. The difference between the demodulated signals for the clockwise and counterclockwise lasers is then taken. This difference signal provides a measure of the cavity length changes due to movement of the MEMS-mounted mirror, from which the acceleration on the system can then be determined. This signal is then fed back through a servo (PZTS1) to the PZT in the ring laser module to correct the cavity length. The two superluminal lasers are then combined with each other on a 50/50 beamsplitter (BS8) and its output is directed into another high-speed photodetector (HSPD2). The beatnote measured by this detector is then mixed with the output of a voltage controlled oscillator (VCO2) set to match the frequency difference between the two superluminal lasers expected from an unmoving system and is demodulated using a phase-locked loop demodulator. The signal from this demodulator is proportional to the rotation rate of the ring laser module, and thus provides the gyroscope signal.

CITED WORKS

[1] W. M. Macek and D. T. M. Davis, "Rotation Rate Sensing With Traveling Wave Ring Lasers," *Applied Physics Letters*, vol. 2, pp. 67-68, 1963.

[2] F. Zarinetchi and S. Ezekiel, "Observation of lock-in behavior in a passive resonator gyroscope," *Optics Letters*, vol. 11, pp. 401-403, 1986/06/01 1986.

[3] R. B. Hurst, N. Rabeendran, K. U. Schreiber, and J.-P. R. Wells, "Correction of backscatter-induced systematic errors in ring laser gyroscopes," *Applied Optics*, vol. 53, pp. 7610-7618, 2014/11/01 2014.

[4] M. S. Shahriar, G. S. Pati, R. Tripathi, V. Gopal, M. Messall, and K. Salit, "Ultrahigh enhancement in absolute and relative rotation sensing using fast and slow light," *Physical Review A*, vol. 75, p. 10, May 2007.

[5] H. N. Yum, M. Salit, J. Yablon, K. Salit, Y. Wang, and M. S. Shahriar, "Superluminal ring laser for hypersensitive sensing," *Optics Express*, vol. 18, pp. 17658-17665, August 2010.

[6] S. Tadigadapa and K. Mateti, "Piezoelectric MEMS sensors: state-of-the-art and perspectives," *Measurement Science and Technology*, vol. 20, p. 092001, 2009.

[7] J. S. Strabley, "Enhanced scale factor ring laser gyroscope," U.S. Pat. No. 7,907,284, 2011.

[8] K. Salit and M. Salit, "Neon or iodine absorption enhanced hene ring laser gyroscope," U.S. Pat. No. 8,432,551, 2013.

[9] M. Salit and K. Salit, "Enhanced scale factor ring laser gyroscope with lasing frequencies away from center of gain profile," U.S. Pat. No. 8,451,451, 2013.

The invention claimed is:

1. A device comprising: two counter propagating ring lasers sharing a common cavity, each incorporating an element that produces a strong anomalous dispersion sufficient to cause the laser fields to propagate with group velocities in excess of the vacuum speed of light, wherein the anomalous dispersion is generated using a resonant Raman process in an alkali vapor, wherein the cavity contains a mirror mounted on an acceleration-sensitive element to generate acceleration detection; and an optical pump module, wherein the optical pump module includes a first 780 nm Distributed Bragg Reflector (DBR) laser and a second 780 nm DBR laser, wherein the output of the first 780 nm DBR laser is locked to an $^{85}$Rb absorption transition, wherein the output of the second 780 nm DBR laser is locked to an $^{87}$Rb absorption transition, wherein the output of the lasers is passed through a heated rubidium vapor cell.

2. The device according to claim 1, wherein the outputs of the two ring lasers are combined and the resulting beat frequency is measured by a readout module, wherein the readout module includes a clockwise demodulator for receiving the clockwise resonant Raman laser signal and a counter clockwise demodulator for receiving a counter clockwise resonant Raman laser signal, wherein the readout module determines the difference in frequency between the clockwise demodulator and counter clockwise demodulator.

3. The device according to claim 1, wherein the device is used to measure rotational rate by a readout module, wherein the readout module includes a clockwise demodulator for receiving the a clockwise resonant Raman laser signal and a counter clockwise demodulator for receiving a counter clockwise resonant Raman laser signal, wherein the readout module determines the difference in frequency between the clockwise resonant Raman laser and the counter clockwise resonant Raman laser, wherein the difference is proportional to the rotational rate of the ring laser, wherein the readout module generates a gyroscope signal based on the difference.

4. The device according to claim 1, wherein the two lasers are operated at different frequencies.

5. The device according to claim 1, wherein the laser gain medium is the vapor of an alkali metal element.

6. The device according to claim 1, wherein the laser gain is generated using a resonant Raman process in $^{85}$Rb atoms.

7. The device according to claim 1, wherein the anomalous dispersion is generated using a resonant Raman process in $^{87}$Rb atoms.

8. The device, according to claim 1, wherein the laser gain and anomalous dispersion generating processes occur in the same vapor cell using different coexisting alkali metal isotopes.

9. The device according to claim 1, wherein the mirror mounted on an acceleration-sensitive element to generate acceleration detection is a mirror attached to a MEMS-fabricated spring, wherein motion of the mirror is used to measure acceleration.

10. The device according to claim 1, wherein the device is used to measure rotation and acceleration simultaneously.

11. A combined superluminal ring laser gyroscope and accelerometer device comprising:
    a clockwise resonant Raman laser pump module;
    a counter clockwise resonant Raman laser pump module;
    an optical pump module;
    a ring laser module; and
    a readout module,
    wherein each of the clockwise resonant Raman laser pump module and the counter clockwise resonant Raman laser pump module incorporate an element that produces a strong anomalous dispersion sufficient to cause the laser fields to propagate with group velocities in excess of the vacuum speed of light, wherein the anomalous dispersion is generated using a resonant Raman process in an alkali vapor,
    wherein the output from the clockwise resonant Raman laser pump module and the counter clockwise resonant Raman laser pump module combine with one of the two optical pump outputs on a dichroic beam combiner to form a combined set of beams,
    wherein the ring laser module receives the combined set of beams in a single cavity, wherein the ring laser module generates a pair of counter-propagating resonant Raman lasers in a single cavity, wherein the cavity contains a mirror mounted on an acceleration-sensitive element to generate acceleration detection,
    wherein the readout module receives the output of the ring laser module to produce a desired rotation and acceleration signal
    wherein the optical pump module includes a first 780 nm Distributed Bragg Reflector (DBR) laser and a second 780 nm DBR laser, wherein the output of the first 780 nm DBR laser is locked to an $^{85}$Rb absorption transition, wherein the output of the second 780 nm DBR laser is locked to an $^{87}$Rb absorption transition, wherein the output of the lasers is passed through a heated rubidium vapor cell.

12. The device of claim 11, wherein the clockwise resonant Raman laser pump module and the counter clockwise resonant Raman laser pump module produce an output of different frequencies.

13. The device of claim 11, wherein the optical pump module provides an output of 780 nm.

14. The device of claim 11, wherein the ring laser module includes three mirrors defining a triangular cavity, wherein the mirror mounted on an acceleration-sensitive element is a gold mirror on MEMS-fabricated springs, wherein a second mirror is a high reflector attached to a PZT cylinder, wherein a third mirror is a concave output coupler.

15. The device of claim 11, wherein the ring laser module includes two rubidium vapor cells, wherein the output of the clockwise resonant Raman laser pump module passes through a first rubidium vapor cell, and the output of the counter clockwise resonant Raman laser pump module pass through a second rubidium vapor cell.

16. The device of claim 11, wherein the readout module includes a counter clockwise length demodulator and a clockwise length demodulator, wherein the readout module determines the difference in signal between the clockwise and counter clockwise demodulators, wherein the readout module provides a measure of the cavity length change due to movement of the MEMS-mounted mirror based on the difference.

17. The device of claim 11, wherein the readout module generates an accelerometer signal.

* * * * *